United States Patent [19]

Falkehag et al.

[11] 3,718,639
[45] Feb. 27, 1973

[54] PROCESS FOR PRODUCING CATIONIC LIGNIN AMINES

[75] Inventors: Sten I. Falkehag, Mount Pleasant; Peter Dilling, Charleston, both of S.C.

[73] Assignee: Westvaco Corporation, New York, N.Y.

[22] Filed: April 26, 1971

[21] Appl. No.: 137,574

[52] U.S. Cl.................260/124 A, 8/94.33, 208/23, 260/348 R, 260/567.6 M
[51] Int. Cl. ............................................C07g 1/00
[58] Field of Search............260/124 R, 124 A, 124 C

[56] References Cited

OTHER PUBLICATIONS

Pearl "Tappi" Vol. 52, No. 4 (1969) p. 594

Primary Examiner—Lewis Cotts
Assistant Examiner—D. R. Phillips
Attorney—Ernest B. Lipscomb and Richard L. Schmalz

[57] ABSTRACT

The process of this invention involves reacting a lignin with the reaction product of epichlorohydrin and a tertiary amine, preferably in salt form. The tertiary amine is preferably converted to salt form with hydrochloric acid and the pH adjusted to between 7–11, preferably between 9 and 9.5. The tertiary amine salt is reacted with epichlorohydrin for about 1 to 6 hours at a temperature below 90° C., preferably below 55°C. The pH of the reaction is slowly raised to around 11 while allowing the reaction to go to completion. From 2 to 10 moles (per 1,000 grams of lignin) of the tertiary amine-epichlorohydrin intermediate are reacted with lignin at a temperature below 90° C., preferably 50° C. for from 1 to 24 hours to forms cationic lignin amines that are water-soluble.

4 Claims, No Drawings

PROCESS FOR PRODUCING CATIONIC LIGNIN AMINES

BACKGROUND OF THE INVENTION

This invention relates to a process for making lignin amines. More particularly, this invention relates to cationic, water-soluble lignin amines that are useful as cationic surface active agents.

Cationic lignin amines have been made by a variety of methods for numerous uses. For instance, cationic lignin amines have been made via the Mannich reaction, in accordance with the procedure described in U.S. Pat. No. 2,709,696 to Wiest et al. In this reaction, lignin is reacted with formaldehyde and a secondary amine. These lignin amines are reacted at the ortho position to the phenolic group in the lignin and are only water-soluble at low or high pH but insoluble around the isoelectric point of the product, generally at pH 5-8. Other Mannich-type lignin amines include, for example, quaternary ammonium salts of lignin made according to the disclosure of Cavagna in U.S. Pat. No. 3,407,188 and are likewise water-insoluble over a portion of the pH range. These lignin amines have found such uses as tanning agents (Wiest et al.), corrosion inhibitors (Ball, U.S. Pat. No. 2,863,780) and in asphalt emulsions (Borgfeldt, U.S. Pat. No. 3,126,350).

It is a general object of this invention to produce cationic lignin amines via the tertiary amine-epichlorohydrin approach that are water-soluble at some acidic condition. Another object of this invention is to produce a lignin amine that is water-soluble at any pH and thus cationic at alkaline conditions. Still another object of this invention is to produce cationic lignin amines that are useful in asphalt emulsions. Further objects, features and advantages of this invention will be evident from the following disclosure.

SUMMARY OF THE INVENTION

The process of this invention involves reacting a lignin with the reaction product of epichlorohydrin and a tertiary amine, preferably in its salt form. The tertiary amine is preferably mixed with hydrochloric acid and the pH adjusted to between 7 and 11, preferably between 9 and 9.5 The epichlorohydrin is reacted for about 1 to 2 hours at a temperature below 90° C., preferably below 55° C. and will drop in pH upon reacting. The pH of the reaction is slowly raised to around 9 or higher while allowing the reaction to go to completion. From 2 to 10 moles (per 1,000 grams of lignin) of tertiary amine-epichlorohydrin reaction products are reacted with lignin at a temperature below 90° C., preferably 50° C. for from 1 to 24 hours to form cationic lignin amines that are water-soluble over the whole pH range or at least at some acidic pH dependent on the degree of modification of the lignin.

DETAILED DESCRIPTION OF THE INVENTION

The cationic, acid-soluble lignin amines of this invention are lignins wherein the hydroxyl groups in the lignin react with the tertiary amine-epichlorohydrin intermediate. As a result of the introduction of positively charged groups, a cationic character is imparted to the lignin. The products of this invention exhibit increased surface activity in a variety of systems. The cationic lignin amines are produced by reaction of the lignin with epoxide or halohydrin group of the intermediate. The intermediate also has a quaternary ammonium group. As hereinafter described in greater detail, the tertiary amine-epichlorohydrin reaction and the lignin reactions may be effected sequentially in either order, and with or without isolation of the reaction product, or simultaneously, depending on the composition and purity desired. It is preferred, however, to make the tertiary amine-epichlorohydrin intermediate prior to the reaction with lignin. By the term "acid-soluble," it is meant that the lignin amines of this invention are water-soluble at some pH below 7.

Tertiary amines suitable for this invention are presented by the general formula:

wherein at least two of $R_1$, $R_2$ and $R_3$ are methyl groups and the other R contains up to 18 carbon atoms. Those tertiary amines possessing at least two methyl groups attached directly to the nitrogen are used because of their superior reactivity to epichlorohydrin to form the desired intermediate. This reactivity is retained even when the third group of tertiary amine contains as many as 18 carbon atoms, such as is found in dimethylstearyl amine. This high reactivity is believed to result from the low order of steric hindrance imparted by the two methyl groups, allowing for intimate contact of epihalohydrin with the free electron pair of the tertiary amino nitrogen. By way of example, the following dimethyl tertiary amines are mentioned as particularly suitable for carrying out this invention; trimethyl, dimethyl-benzyl, dimethyldodecyl, dimethyloctyl and dimethylstearyl amines.

The reaction between the tertiary amine and epichlorohydrin is shown by the following reactions, using trimethylamine hydrochloride salt reacted with epichlorohydrin for illustrative purposes in reaction [1] followed by conversion to the epoxide form with sodium hydroxide in reaction [2].

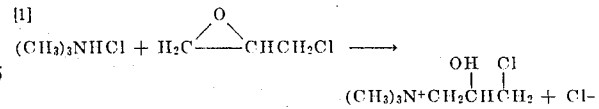

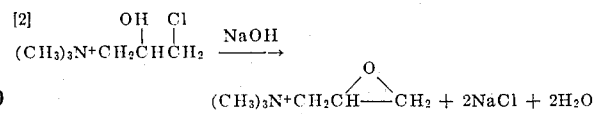

The tertiary amine and epichlorohydrin are normally reacted in equimolar amounts, but it is sometimes desirable to have an excess of the tertiary amine. The products of these reactions will be referred to throughout the specification as the "intermediate."

Preparation of the intermediate is readily effected in an aqueous solution by dissolving the tertiary amine in an acid, such as hydrochloric or acetic, to form the tertiary amine salt. The pH of the tertiary amine salt should be between 7 and 11, preferably about pH 9 to 9.5, and if not it should be adjusted with a strong base, such as sodium hydroxide or potassium hydroxide. Epichlorohydrin is then added to the tertiary amine salt solution. During the first phase of the intermediate reaction a halohydrin ammonium product is formed which subsequently is converted to the epoxide product.

The hydrolysis of both halohydrin and epoxide structures is kept low by maintaining the hydroxide ion concentration at the lowest possible level. Suitable temperatures for this reaction are from about 0° C. to about 90° C., and preferably below about 55° C. The epichlorohydrin and tertiary amine are allowed to react for about 1 to 2 hours during which time the pH begins to drop, for instance, about pH 8–7.5, at which time a strong base, i.e., sodium hydroxide is slowly added over the remainder of the reaction period in an amount of sufficient to maintain the pH above 9. The time for reaction of tertiary amine-epichlorohydrin before adding the strong base is not in itself critical but depends upon the temperature and time taken for the pH to drop. The reaction time is dependent on the temperature and will proceed to completion in, for instance, about 4 hours at 45° C.

The intermediate is directly reacted with lignin, or it first may be concentrated and purified by recrystallization from a suitable alcohol, such as ethanol. Although it is not essential, it is desirable to remove from the reaction product unreacted epihalohydrin, if present.

One of the main sources of lignin is the residual pulping liquors of the paper and pulp industries where lignocellulosic materials such as wood, straw, corn stalks, bagasse, and the like are processed to separate the cellulose or pulp from the lignin. The lignins employed to make the products of this invention include lignins from such processes as alkali lignins from the sulfate (kraft) pulping process and lignins derived from other alkaline processes, such as the soda or modified soda processes, and lignosulfonates from acid, and neutral and alkaline sulfite processes. Likewise, lignin known as "hydrolysis lignin" obtained from the hydrolysis of lignocellulosic materials in manufacturing wood sugars, or "hydrotropic lignins" derived from hydrotropic pulping processes may be used. Other hydroxyl group-containing wood components, such as "bark lignin" and extractives, sometimes called polyphenols and other non-carbohydrate wood derived components, may also be employed. The lignin starting material, preferably an alkali lignin, used to form the amines is in partly ionized form at neutral or alkaline conditions. The particular choice and character of lignin will determine the ease with which solubility is obtained depending upon the molecular weight of the lignin.

The reaction of lignin and the intermediate may be illustrated by the following reaction wherein the intermediate of trimethylamine and epichlorohydrin is representative:

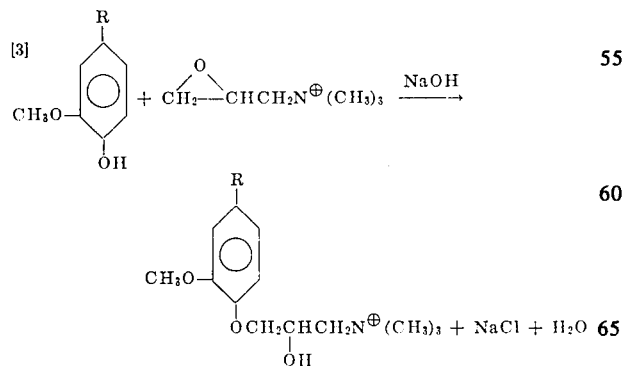

The intermediate-lignin reaction is readily effected at temperatures of from about 0° C. to about 100° C., with preferred temperature being below 55° C. Any suitable technique may be utilized to accomplish contact of the lignin with the intermediate to thereby introduce the quaternary nitrogen-containing groups into the product. The lignin material subjected to quaternization is either in solution or as a finely divided solid in an inert solvent such as water, acetonitrile, lower aliphatic alcohols, acetone, dioxane, mono- and diethers of ethylene glycol, and the like. The lignin may be added to the tertiary amine-epichlorohydrin reaction prior to its completion, but the usual case is to add the lignin to the intermediate after the tertiary amine-epichlorohydrin reaction is complete. Anhydrous reaction conditions can be employed but it is preferred that water be present in the reaction system. The time required to accomplish the reaction product-lignin reaction will vary from about 1 to about 24 hours, more usually from about 4 to about 8 hours. The products are, if desired, dried by conventional methods, such as spray drying.

In effecting the intermediate-lignin reaction, the proportion of intermediate to lignin to obtain a lignin amine that is water-soluble at some acid pH, at least 2 moles of intermediate per 1,000 grams of lignin must be reacted. The maximum amount of intermediate that is reacted depends upon the number of hydroxyl groups present in the lignin molecule but will not usually exceed 10 moles of intermediate per 1,000 grams of lignin. By varying the molar ratio of the intermediate to lignin, products having different characteristics may be obtained. For example, lignin amines produced from reacting 2 to 4 moles of intermediate per 1,000 grams of lignin are water-soluble at some acid pH. Products soluble at any pH and thus cationic even at alkaline conditions are made by reacting from 4 moles to 10 moles of intermediate per 1,000 grams of lignin. Water solubility is considered to have been achieved when at least a 1 percent solution of the lignin amine can be made.

Alkaline catalysts, such as sodium hydroxide, potassium hydroxide, lithium hydroxide, tetramethyl ammonium hydroxide, tetraethyl ammonium hydroxide, and the like, are employed to catalyze the intermediate-lignin reaction. The amount of catalyst utilized will depend primarily upon whether the quaternizing agent employed is the quaternary epichlorohydrin or the quaternary epoxide, but also upon the molar amount of intermediate used and the degree of reaction desired. Where the quaternary epichlorohydrin is employed, an amount of catalyst of from slightly more than 1 to about 3 moles per mole of quaternary epichlorohydrin is satisfactory, while when the quaternary epoxide is employed suitable amounts are from about 0.01 to about 2 moles per mole of quaternary epoxide.

The lignin amines of this invention are cationic and because certain of them are water-soluble over the whole pH range, they are suitable for a variety of uses where surface active products are needed. They are useful as flocculating agents, coagulants, retention aids, dispersing agents, emulsifiers and emulsion stabilizers.

The practice of this invention may clearly be seen in the following example.

EXAMPLE 1

To illustrate the effects of varying the molar ratio of intermediate to lignin, a series of runs were made varying the molar ratios. The general procedure used was as follows.

The intermediate was made adding a 25 percent aqueous solution of trimethylamine (0.12 moles) to a solution of 38 percent hydrochloric acid (9.46 grams acid, 0.12 moles) until the pH reached 9.1. After addition of 9.25 grams epichlorohydrin (0.1 moles) the temperature climbed to 40°–45° C. After 1 hour of stirring the pH of the solution was raised to 9.6 with 2N sodium hydroxide and 30 minutes later to 10.4. Then the volume of the mixture was reduced under a vacuum at 45°–50° C. to a quarter of the original volume (beginning of crystallization).

The reaction of intermediate with the lignin was effected by adding the intermediate to a solution of 20 grams kraft pine lignin in 60 ml of water at pH 11 (5 moles intermediate/1,000 grams of lignin). For the various runs, the molar ratio of intermediate was changed. The reaction mixture was heated to various temperatures under different alkaline conditions for 19 hours.

The critical levels of acid solubility and solubility at any pH were determined by withdrawing samples of the 3 mole and 5 mole product at the closest possible moment when solubility occurred. This solubility can be obtained even within 1 hour. The products were evaluated and the results shown in the table below.

| Moles of intermediate/ 1000 gms. of lignin | Reaction temp. °C | Final pH | nitrogen content (%) | solubility at pH 2 | Solubility at any pH |
|---|---|---|---|---|---|
| 2 | 45 | 11–12.5 | 1.65 | + | – |
| 2.5 | 45 | 11–12.5 | 1.65 | + | – |
| 3 | 95 | 11 | 1.47 | + | – |
| 3 | 95 | 11–12.5 | 1.90 | + | – |
| 3 | 45 | 12.5 | 1.80 | + | – |
| 3 | 45 | 11–12.5 | 1.93 | + | – |
| 4 | 45 | 11–12.5 | 3.20 | + | + |
| 5 | 80 | 11–12.5 | 3.22 | + | + |
| 5 | 50 | 11–12.5 | 3.50 | + | + |
| 10 | 50 | 11–12.5 | 5.27 | + | + |

Color of cationic lignin amine products were considerably lighter than alkali lignin. The acid solubility was determined by at least 1 gram of cationic lignin amine being soluble in 100 ml. of water at pH 2. The 3 mole product precipitated as the pH was raised above 7. The 4, 5 and 10 mole cationic lignin amine did not precipitate at any pH. The results also indicate that at least about 1.5 percent nitrogen has been introduced into the amine. This indicates that at least 1.5 percent nitrogen is necessary for solubility. Of course, solubility also depends upon other factors such as molecular weight of the lignin.

EXAMPLE 2

This example illustrates the preparation of cationic lignin amines of this invention using different lignins.

A reaction product using epichlorohydrin and trimethylamine as the reactants was prepared as described in Example 1. The cationic lignin amine was prepared by reacting various moles of the intermediate per 1,000 grams of the selected lignin using the procedure also described in Example 1. The products were tested for nitrogen content and acid solubility at pH 2.

| Lignin Used | Mole of Intermediate Reacted/1000 gms. lignin | Nitrogen Content, 70 | Solubility at pH 2 |
|---|---|---|---|
| Sulfite-based (Marasperse CB) | 5 | 4.96 | + |
| Hardwood lignin (Reax31) | 8 |  | + |
| Demethylated lignin | 5 | 2.24 | + |
| Hexamethylene-tetra-amine lignin | 5 |  | + |

The results shown above clearly show that lignin amines made according to the process of this invention are water-soluble at acid pH's using various lignins. Acid solubility of sulfite-based lignins is difficult to obtain until the large amounts of salts and other non-lignin materials are removed or substantially lessened. It appears that nitrogen content is an indication of the amount of solubility if cross-linking has not occurred.

EXAMPLE 3

To illustrate the applicability of the process of this invention to to other tertiary amines of the class claimed, an intermediate product of dimethyloctyl amine and epichlorohydrin was prepared according to the procedure set forth in Example 1. Two moles of the intermediate per 1,000 grams of lignin and 6 moles trimethylamine intermediate were reacted with pine kraft lignin. After 20 hours of reaction time at 45° C. only approximately 50 percent of the lignin had precipitated. The soluble portion was filtered off and the pH lowered to 2. The lignin amine remained soluble.

A lignin amine containing 3 moles dof trimethylamine-epichlorohydrin intermediate was tried as a cationic asphalt emulsion stabilizer and produced satisfactory slow-break emulsion.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

Having thus described the invention, what is claimed is:

1. Lignin amines being the compounds obtained by reacting together in approximately equimolar amounts at a temperature below 90° C. epichlorohydrin and a tertiary amine having the general formula:

wherein at least two of $R_1$, $R_2$ and $R_3$ are methyl groups and the remaining R contains no more than 18 carbon atoms to form an intermediate, and reacting with lignin from 2 to 10 moles of said intermediate per 1,000 grams of lignin, at a temperature below 90° C. to form the lignin amine, said lignin amine being characterized by being cationic and water-soluble at acidic, neutral or alkaline conditions in a 1 percent solution.

2. A process for producing water-soluble, cationic lignin amines which comprises reacting at a beginning pH between 7 and 11 and a temperature below 90° C. in approximately equimolar amount epichlorohydrin and a tertiary amine having the general formula:

wherein at least two of $R_1$, $R_2$ and $R_3$ are methyl groups and the remaining R contains no more than 18 carbon atoms reacting to form an intermediate and reacting said intermediate with lignin from 2 to 10 moles of the intermediate per 1,000 grams of lignin at a temperature below 90° C. for from 1 hour to 24 hours.

3. The process of claim 2 wherein the tertiary amine is trimethylamine and the lignin is kraft pine lignin.

4. The process of claim 3 wherein the trimethylamine and epichlorohydrin are reacted in equimolar amounts at a temperature below 55° C.

* * * * *